(12) United States Patent
Park et al.

(10) Patent No.: US 10,497,934 B2
(45) Date of Patent: Dec. 3, 2019

(54) NEGATIVE ELECTRODE MATERIAL FOR SECONDARY BATTERY, METHOD FOR PREPARING THE SAME AND SECONDARY BATTERY HAVING THE SAME

(71) Applicant: LG CHEM, LTD., Seoul (KR)

(72) Inventors: Su Jin Park, Daejeon (KR); Yong Ju Lee, Daejeon (KR); Eun Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/331,507

(22) Filed: Oct. 21, 2016

(65) Prior Publication Data

US 2017/0117542 A1   Apr. 27, 2017

(30) Foreign Application Priority Data

Oct. 23, 2015   (KR) .......................... 10-2015-0148186

(51) Int. Cl.
| | |
|---|---|
| *H01M 4/36* | (2006.01) |
| *H01M 10/0525* | (2010.01) |
| *H01M 4/48* | (2010.01) |
| *H01M 4/38* | (2006.01) |
| *H01M 4/62* | (2006.01) |

(52) U.S. Cl.
CPC .......... *H01M 4/366* (2013.01); *H01M 4/386* (2013.01); *H01M 4/387* (2013.01); *H01M 4/483* (2013.01); *H01M 4/625* (2013.01); *H01M 10/0525* (2013.01)

(58) Field of Classification Search
CPC ......... H01M 4/366; H01M 4/13; H01M 4/386
See application file for complete search history.

(56) References Cited

U.S. PATENT DOCUMENTS

| | | | | |
|---|---|---|---|---|
| 2011/0244334 A1* | 10/2011 | Kawada | .................. | C23C 16/26 429/231.8 |
| 2012/0115033 A1* | 5/2012 | Kim | ...................... | H01M 4/133 429/231.8 |
| 2012/0202112 A1* | 8/2012 | Yushin | .................... | H01M 4/38 429/200 |
| 2014/0242461 A1* | 8/2014 | Hwang | ................. | H01M 4/366 429/217 |

FOREIGN PATENT DOCUMENTS

| | | |
|---|---|---|
| JP | 2012-164624 A | 8/2012 |
| KR | 10-2005-0090218 A | 9/2005 |

* cited by examiner

*Primary Examiner* — Olatunji A Godo
(74) *Attorney, Agent, or Firm* — Birch, Stewart, Kolasch & Birch, LLP

(57) ABSTRACT

A negative electrode active material for a secondary battery is provided. The negative electrode active material is composed of a composite including a metal element-doped inorganic particle or inorganic oxide particle, and a polymer coating layer coated on the metal element-doped inorganic particle or inorganic oxide particle, wherein the metal element is included in an amount of 0.01 to 20 parts by weight based on 100 parts by weight of the inorganic particle or inorganic oxide particle. Also provided are a method for preparing the negative electrode active material and a secondary battery having enhanced lifetime and high-efficiency charge/discharge properties by including the negative electrode active material.

20 Claims, 5 Drawing Sheets

NEGATIVE ELECTRODE MATERIAL FOR SECONDARY BATTERY, METHOD FOR PREPARING THE SAME AND SECONDARY BATTERY HAVING THE SAME

CROSS-REFERENCE TO RELATED APPLICATION(S)

This application claims the benefit of Korean Patent Application No. 10-2015-0148186, filed on Oct. 23, 2015, in the Korean Intellectual Property Office, the disclosure of which is incorporated herein in its entirety by reference.

TECHNICAL FIELD

The present disclosure relates to a negative electrode active material for a secondary battery, a method for preparing the same, and a secondary battery including the same, and more particularly, to a negative electrode active material for a secondary battery in which the initial non-reversible capacity may be reduced during electrical charging/discharging, a method for preparing the same, and a secondary battery including the same and thus having excellent lifetime properties and high-rate charge/discharge properties.

BACKGROUND

Lithium secondary batteries are small, lightweight, high-capacity batteries which have been widely used since appearing in 1991. In particular, as recent, rapid advancements in the electronics, communications, and computer industries have led to the development of camcorders, mobile phones, notebook computers, and the like, demand for lithium secondary batteries as a power source for driving these mobile electronic data communication devices is continuously increasing.

Lithium secondary batteries are manufactured by charging an organic electrolyte solution or polymer electrolyte solution between a positive electrode and negative electrode in which lithium ions may be reversibly intercalated and deintercalated, and electrical energy is generated by a redox reaction which occurs when the lithium ion is intercalated/deintercalated in the positive electrode or the negative electrode.

Currently, chalcogenide compounds are used for the positive electrode, and examples thereof include transition metal composite oxides such as $LiCoO_2$, $LiMn_2O_4$, $LiNiO_2$, $LiNi_{1-x1}Co_{x1}O_2 (0<x1<1)$, and $LiMnO_2$, which are currently being developed.

Moreover, in addition to lithium metal, materials with high theoretical capacity are being used as negative electrode active materials, for example, crystalline carbons such as graphite and synthetic graphite, and amorphous carbons such as soft carbon and hard carbon, and the like. However, although the crystalline carbon has a relatively high capacity, the capacity is still only 380 mAh/g, and thus it will be difficult to be used in the development of future high-capacity lithium secondary batteries. Moreover, although the amorphous carbon has a high theoretical capacity, the amorphous carbon exhibits a high non-reversibility during the charging/discharging process. When the non-reversible capacity is high, the lithium ions are consumed, making it is impossible to completely charge/discharge the active material, and thus have a disadvantageous effect on the energy density of the battery.

In order to overcome these limitations, a method has been researched in which a metal-based or intermetallic compound-based materials such as on aluminum, germanium, silicon (Si), tin (Sn), zinc, and lead, is used as negative electrode active materials in place of carbon-based materials as above.

The metal-based or intermetallic compound-based materials have high capacity and high energy densities, and are able to store and release more lithium ions than carbon-based materials, and thus are desirable for manufacturing secondary batteries having high capacities and high energy densities.

However, the metal-based or intermetallic compound-based materials have worse cycle characteristics than carbon-based materials, and thus have been difficult to commercialize. For example, when inorganic particles such as the silicon or tin are used as-is as negative electrode active materials, excessive volume changes that occur due to lithium intercalation/deintercalation during the charging/discharging process cause the conductivity between the active materials to degrade or the negative electrode active material to peel off from a negative electrode current collector. In particular, in the case of the negative electrode active materials having a small particle diameter or large specific surface area, side reactions with the electrolyte solution increase as the contact surface with the electrolyte solution increases during the initial lithium intercalation, and consequently, the initial non-reversible capacity increases such that the initial efficiency is disadvantageously reduced.

Therefore, there is a strong demand for the development of a negative electrode active material for a lithium secondary battery capable of overcoming such limitations while also having excellent lifetime properties and excellent high-rate charge/discharge properties.

DISCLOSURE OF THE INVENTION

Technical Problem

Accordingly, an aspect of the present disclosure is to provide a negative electrode active material for a lithium secondary battery, in which the initial non-reversible capacity during electrical charge/discharge may be reduced.

Another aspect of the present disclosure is to provide a method for preparing the negative electrode active material for a lithium secondary battery.

Another aspect of the present disclosure is to provide a negative electrode including the negative electrode active material for a lithium secondary battery.

Another aspect of the present disclosure is to provide a lithium secondary battery which includes the negative electrode and thus has excellent lifetime properties and excellent high-efficiency charge/discharge properties.

Technical Solution

In accordance with an aspect of the present disclosure, a negative electrode active material for a lithium secondary battery is provided. The negative electrode active material is composed of a composite including a metal element-doped inorganic particle or inorganic oxide particle; and a polymer coating layer coated on the metal element-doped inorganic particle or inorganic oxide particle, wherein the metal element is included in an amount of 0.01 to 20 parts by weight based on the 100 parts by weight of the inorganic particle or inorganic oxide particle.

The inorganic particle may include one or a mixture of two or more selected from the group consisting of Si, Si-based alloys, Sn, and Sn-based alloys.

The inorganic oxide particle may include one selected from the group consisting of $SiO_x$ ($0<x\leq2$) and $SnO_2$.

The metal element may include at least one selected from the group consisting of Li, Na, K, Mg, Ca, and Al.

A carbon coating layer may be further included on the surface of the inorganic particle or inorganic oxide particle In accordance with another aspect of the present disclosure, a method is for preparing a negative electrode active material for a lithium secondary battery is provided. The method includes mixing an inorganic particle or inorganic oxide particle with a metal precursor in an inert atmosphere and then baking to prepare a metal element-doped inorganic particle or inorganic oxide particle; and forming a polymer coating layer on the surface of the metal element-doped inorganic particle or inorganic oxide particle.

Here, the method may further include mixing the inorganic particle or inorganic oxide particle with a carbon precursor and then baking to form a carbon coating layer on the surface of the inorganic particle or inorganic oxide particle before mixing the inorganic particle or inorganic oxide particle with the metal precursor.

The operation for forming the polymer coating layer may include an dissolving an organic polymer in an organic solvent to prepare a coating solution; introducing the metal element-doped inorganic particle or inorganic oxide particle into the polymer coating solution and then stirring at room temperature; and removing the organic solvent and then drying.

In addition, in accordance with another aspect of the present disclosure, a negative electrode including the negative electrode active material for a lithium secondary battery, and a lithium secondary battery including the same may be provided.

Advantageous Effects

According to an embodiment of the present disclosure, by doping the interior of an inorganic particle or inorganic oxide particle with a metal element, a lithium secondary battery may be manufactured in which, an excessive volumetric expansion that occurs when lithium ions are intercalated/deintercalated may be suppressed, and also, the initial non-reversible capacity may be reduced such that the cycle properties and the high-capacity charge/discharge properties are enhanced.

BRIEF DESCRIPTION OF THE DRAWINGS

The drawings herein illustrate exemplary embodiments of the present disclosure, and together with the description, serve to better explain the technical concept of the present disclosure. Thus, the present disclosure should not be construed as limited to the features illustrated in the drawings.

DETAILED DESCRIPTION

Hereinafter, the present disclosure is described in greater detail to facilitate understanding thereof.

The wordings or terms used in the specification and claims are not limited to their typical or dictionary definitions. Rather wordings or terms as used herein are to be understood as defined by the inventor to best convey the technical concepts of the present disclosure.

In order to achieve such objectives, the present disclosure provides a negative electrode active material for a secondary battery, wherein the interior of an inorganic particle or an inorganic oxide particle is doped with a metal element, and a polymer coating layer is formed on the surface thereof.

Moreover, the present disclosure provides a method for preparing such a negative electrode active material.

Furthermore, the present disclosure provides a lithium secondary battery including a negative electrode that includes the negative electrode active material for a secondary battery.

Negative Electrode Active Material for Secondary Battery

Specifically, in an embodiment of the present disclosure a negative electrode active material for a lithium secondary battery is provided, the negative electrode active material being composed of a composite which includes a metal element-doped inorganic particle or inorganic oxide particle; and a polymer coating layer coated on the metal element-doped inorganic particle or inorganic oxide particle, wherein the metal element is included in an amount of 0.01 to 20 parts by weight based on the 100 parts by weight of the inorganic particle or inorganic oxide particle.

Here, the inorganic particle or inorganic oxide particle may further include a carbon coating layer on the surface of the particle.

Figure 1:
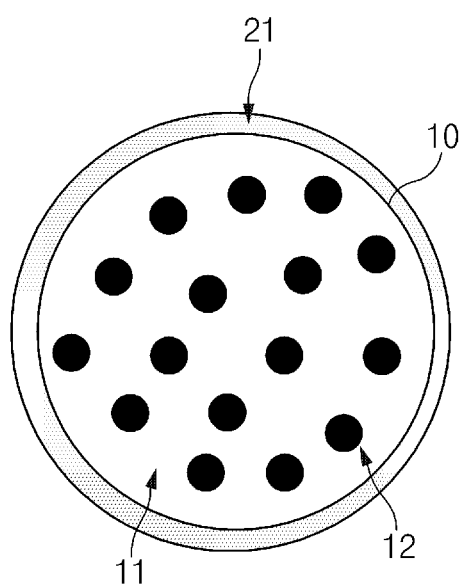
FIG. 1 is a schematic diagram illustrating a negative electrode active material for a lithium secondary battery prepared according to the present disclosure.

FIG. 1 is a cross-sectional diagram schematically illustrating a negative electrode active material of the present disclosure.

That is, as may be see in FIG. 1, the negative electrode active material of the present disclosure is composed of a composite structure in which the interior of the inorganic particle or inorganic oxide particle 11 is doped with a metal element 12 and the surface of the inorganic particle or inorganic oxide particle is coated with a polymer coating layer 21. Moreover, the negative electrode active material of the present disclosure may, as needed, further include a carbon coating layer 10 between the polymer coating layer 21 and the surface of the inorganic particle or inorganic oxide particle 11.

(1) Inorganic Particle or Inorganic Oxide Particle

In the negative electrode active material for a secondary battery of the present disclosure, the inorganic particle or inorganic oxide particle may include one or a mixture of two or more selected from the group consisting of silicon (Si), tin, and oxides thereof.

Specifically, the inorganic particle may include one or a mixture of two or more selected from the group consisting of Si, Si-based alloys, Sn, and Sn-based alloys, and among these, may include Si, which has a high capacity. Moreover, the inorganic oxide particle may include one selected from the group consisting of $SiO_x$ ($0<x\leq2$), and $SnO_2$, and specifically, may include SiO, $SiO_2$, or $SnO_2$.

Here, prior to metal element doping, the discharge capacity and efficiency of SiO are 1500 mAh/g and 74%, respectively, and the discharge capacity and efficiency of $SiO_2$ are 1050 m Ah/g and 65%, respectively. That is, having a higher number of oxygens, $SiO_2$ is expected to have a lower initial efficiency and a lower discharge capacity than SiO.

Moreover, since Sn itself is a heavier element than Si, $SnO_2$ has a relatively low initial efficiency of 775 mAh/g and 51%.

In addition, the inorganic particle or inorganic oxide particle of the present disclosure may also include a composite composed of an amorphous Si having a high capacity and crystalline $SiO_2$. When this composite is included, the composite react with oxygen contained in an electrolyte solution to form an initial non-reversible, and thus the greater volumetric expansion of the negative electrode active material compared with typical metal-based negative electrode active materials may be mitigated to a certain degree.

In the negative electrode active material of the present disclosure, the specific surface area of the inorganic particle or inorganic oxide particle may be 0.2 $m^2$/g to 2 $m^2$/g. The average particle diameter (D50) of the inorganic particle or inorganic oxide particle may be 0.05 nm to 30 μm, specifically, 0.5 nm to 15 μm.

Here, the average particle diameter (D50) of the negative electrode active material particle may be measured using a laser scattering method or an electrical resistance method (Coulter counter method), and specifically, the laser scattering method was used.

The laser scattering method is a method which utilizes the light to scattering, that is the simultaneous and combined effects of diffraction, refraction, reflection, and absorption, which appear when laser irradiation, wherein the particle size is derived based on the principle in which the scattering intensity is proportional to the particle size and the scattering angle is inversely proportional to the particle size. Particles passing through a laser beam scatter light, and the scattered light forms a different scattering pattern for each angle, which is analyzed by being detected by a photodetector array. In such laser scattering methods, fine particles are beyond the detection range and thus are mostly undetected.

In the present disclosure, the measurement may be performed on a specimen in the form of a dispersion formed by dispersing the active material in water, which is the solvent, and adding a surfactant as needed.

(2) Metal Element

In the negative electrode active material for a secondary battery prepared according to an embodiment of the present disclosure, non-reversible phases such as lithium oxide may be minimized by doping the inorganic particle or inorganic oxide particle with a metal element and thereby alloying beforehand.

Here, non-reversible phases such as the lithium oxide are formed in the initial charging/discharging of the battery and known to be a cause of reduced initial efficiency. Thus, in the negative electrode active material of the present disclosure, the initial efficiency of the negative electrode active material may be increased by minimizing the formation of non-reversible phases such as the lithium oxide.

The metal element may be at least one selected from the group consisting of Li, Na, Ca, K, Mg, and Al. Among these, Li, Mg, Ca, and Al are the most desirable.

The metal element may have a concentration gradient that decreases going from the surface to the inside of a core of the inorganic particle or inorganic oxide particle. The metal element may also exist in a uniformly dispersed state on the surface of the inorganic particle or inorganic oxide particle.

Here, the metal element is included in an amount of 0.01 to 20 parts by weight, more specifically 0.1 to 20 parts by weight based on the 100 parts by weight of the inorganic particle or inorganic oxide particle.

When the metal element content is below 0.01 parts by weight, the interior of the inorganic particle or inorganic oxide particle is incompletely doped with the metal element, and thus the metal element doping effect is insignificant. When the metal element content exceeds 20 parts by weight, excess amounts of inactive phases such as Li—Si compounds are formed by the alloying of the inorganic particle or inorganic oxide particle and the metal element, and consequently, the discharge capacity per unit weight is reduced and the cycle characteristics of the secondary battery are degraded.

The concentration of the metal element doped in the interior of the inorganic particle or inorganic oxide particle may be measured using an inductively coupled plasma spectrometer (ICP, Perkin Elmer, Optima 5300DV).

(3) Polymer Coating Layer

The negative electrode active material for a secondary battery of the present disclosure may include a polymer coating layer composed of a single layered film or a multi-layered film of two or more layers.

Specifically, the polymer coating layer may be composed of an organic polymer, which has a carbonization temperature of at least 800° C. and may be used in combination with an organic solvent. Representative examples of such an organic polymer may include one or a mixture of two or more selected from the group consisting of polyethylene oxide, polyvinylpyrrolidone, polyacrylic acid, polyvinyl alcohol, polyethyleneimine, and polyacrylonitrile (PAN).

The thickness of the polymer coating layer may be 200 nm or less, specifically 20 to 200 nm, more specifically 30 to 150 nm, or more specifically 35 to 100 nm.

When the thickness of the polymer coating layer is at least 20 nm, a physical bond may be maintained between the inorganic or inorganic oxide and the carbon coating layer, while at the same time the volumetric change in the inorganic particle or inorganic oxide particle due to the intercalation and deintercalation of lithium ions may be appropriately accommodated and side reactions due to lithium side products may be controlled. Moreover, it is desirable for the thickness of the polymer coating layer to be no greater than 200 nm in order to ensure that lithium ion intercalation and deintercalation are not inhibited. As such, in the negative electrode active material of the present disclosure, the physical properties may be tuned by adjusting the thickness of the polymer coating layer.

The polymer coating layer is included in an amount of 0.1 to 10 parts by weight based on the 100 parts by weight of the inorganic particle or inorganic oxide particle.

When the polymer coating layer content is below 0.1 parts by weight, the role of the polymer coating layer as a supporting body against the volumetric expansion of the active material which can occur in the inorganic particle or inorganic oxide particle during charging/discharging may be significantly diminished, and consequently, the electrode lifetime may be degraded. Moreover, there is a limitation in that the side reaction-suppressing effect of the lithium oxide is insignificant. When the polymer coating layer content exceeds 10 parts by weight, the discharge capacity of the active material itself is reduced due to the reduced ratio of the inorganic particle or inorganic oxide particle, and thus a lower energy density than conventional carbon-based negative electrode active materials may be realized.

As such, the negative electrode active material for a secondary battery of the present invention includes the metal element-doped inorganic particle or inorganic oxide particle and the polymer coating layer such that the formation of lithium side products may be reduced without damaging the surface of the negative electrode and the inorganic particle or inorganic oxide particle may be protected from the electrolyte solution. Thus, the cycle lifetime properties and the high-rate charge/discharge properties may be further improved.

(4) Carbon Coating Layer

In the negative electrode active material for a secondary battery of the present disclosure, before doping the metal element, a carbon coating layer may be further formed on the surface of the inorganic particle or inorganic oxide particle.

The carbon coating layer may be formed by a method in which heat treatment is performed while mixing a carbon precursor with the inorganic particle or inorganic oxide particle. Representative examples of such a carbon precursor may include at least one carbon-containing gas selected from the group consisting of methane, ethane, propane, ethylene, and acetylene gas.

Moreover, the carbon coating layer may include a crystalline or an amorphous carbon coating layer. The crystalline carbon coating layer may be formed by mixing the inorganic particle or inorganic oxide particle with a crystalline carbon in a solid or liquid phase and then heat treating. The amorphous carbon coating layer may be formed by using a method in which the inorganic particle or inorganic oxide particle is coated with an amorphous carbon precursor and then carbonized by being heat treated.

Here, representative examples of the crystalline carbon may include graphene and graphite.

Specific examples of the amorphous carbon precursor may be any one selected from the group consisting of resins, a coal-based pitch, tar, and low molecular weight heavy oil. The examples of resin may be a phenol resin, a naphthalene resin, a polyvinyl alcohol resin, a urethane resin, a polyimide resin, a furan resin, a cellulose resin, an epoxy resin, a polystyrene resin, and the like.

In addition, the carbon coating layer may also be formed using a dry method, a wet method, or a combined method in which the dry method and the wet method are combined.

The carbon coating layer is commonly included in an amount of 0.005 to 30 parts by weight, specifically 0.05 to 25 parts by weight, and more specifically 1 to 10 parts by weight based on 100 parts by weight of the inorganic particle or inorganic oxide particle. When more than 30 parts by weight of the carbon coating layer is included, the thickness of the carbon coating layer is excessively thick, and thus lithium ion intercalation and deintercalation may be inhibited.

The negative electrode active material of the present disclosure may include a metal element in not only the inorganic particle or inorganic oxide particle, but also inside the carbon coating layer. Here, the metal element may be included in the range of 0.01 to 10 wt %, specifically 1 to 7 wt % with respect to the total weight of the carbon coating layer, and there may be a metal element concentration gradient that decreases going from the surface to the interior of the carbon coating layer.

When uneven cracks are generated on the negative electrode active material, electrically disconnected regions may form as charging/discharging is repeated, and the cracks may cause newly formed surfaces to contact the electrolyte solution such that excessive side reactions occur and cause degradation of the lifetime properties. By performing the role of a barrier that regulates the reaction between the metal element—which was inserted beforehand to increase the initial efficiency—and the metal oxide, the carbon coating layer may prevent the rapid growth of a metallic crystal phase in the inorganic particle or inorganic oxide particle, and consequently, an effect in which cracks generated by stress due to volumetric expansion of the inorganic particle or inorganic oxide particle are reduced may be obtained.

Typically, metal-based negative electrode active materials have the advantages of stable electrode lifetime properties, stability in air, and being able to bond with lithium transition metal oxide, which is the positive electrode material, but has the disadvantages of experiencing excessive volumetric expansion when lithium is intercalated during electrical charging/discharging and exhibiting a large non-reversible capacity due to reactions with the electrolyte solution during the initial cycle.

Conversely, when, as in the negative electrode active material of the present disclosure, an inorganic particle or inorganic oxide particle is alloyed (doped) beforehand with a metal element, and a carbon coating layer and a polymer coating layer are formed on the surface of the particle, since reaction with the electrolyte solution during the initial charge/discharge cycle may be prevented to thereby reduce the non-reversible capacity, the initial charge/discharge efficiency may be increased. Moreover, due to the polymer coating layer formed on the surface, the volumetric expansion of the inorganic particle or inorganic oxide particle during the charging/discharging process may be suppressed, and at the same time, deintercalation caused by the volumetric expansion which occurs after charging/discharging may be prevented. Furthermore, an effect may be obtained in which side reactions of the lithium source which did not reacted during the process and is remained on the surface of the inorganic particle or inorganic oxide particle are prevented.

Method for Preparing Negative Electrode Active Material for Secondary Battery

Hereinafter, a method for preparing a negative electrode active material of the present disclosure is described.

Specifically, in an embodiment of the present disclosure is provided a method for preparing a negative electrode active material for a lithium secondary battery, the method including mixing an inorganic particle or inorganic oxide particle with a metal precursor in an inert atmosphere and then baking to prepare a metal element-doped inorganic particle or inorganic oxide particle; and forming a polymer coating layer on the surface of the metal element-doped inorganic particle or inorganic oxide particle.

Here, the method of the present disclosure may further include mixing the inorganic particle or inorganic oxide particle with a carbon precursor and then baking to thereby form a carbon coating layer on the surface of the inorganic particle or inorganic oxide particle before mixing the inorganic particle or inorganic oxide particle with the metal precursor.

Specifically, the step for forming the carbon coating layer may include increasing the temperature of the inorganic particle or inorganic oxide particle to 800° C. in an inert atmosphere; introducing the carbon precursor while stirring the inorganic particle or inorganic oxide particle; and performing a heat treatment while mixing the inorganic particle or inorganic oxide particle with the carbon precursor.

Here, the inert gas is desirably argon.

In addition, the step for increasing the temperature is desirably performed by increasing the temperature at a rate of 1 to 10° C./min to at least 800° C., specifically 1000° C., in order to enable the reaction to proceed sufficiently.

The carbon precursor may be at least one compound selected from the group consisting of methane, ethane, propane, ethylene, and acetylene gas, and is desirably introduced at a rate of 0.1 L/min to 1 L/min, specifically 0.1 L/min to 0.5 L/min, in order to enable the reaction to proceed sufficiently.

The heat treatment may be performed at 800 to 1100° C. for 3 to 10 hours.

In the method of the disclosure, representative examples of the metal precursor may include at least one metal powder selected from the group consisting of Li, Na, Ca, K, Mg, and Al or metal salts thereof, and specifically, may include at least one metal powder selected from the group consisting of Li, Mg, Ca, and Al.

Representative examples of the lithium element-containing lithium precursor may include one or a mixture of two or more selected from the group consisting of Li metal powder, LiH, LiAlH$_4$, LiOH, Li$_2$CO$_3$, LiCl, Li$_2$O, and LiF. Representative examples of the magnesium element-containing magnesium precursor may include one or a mixture of two or more selected from the group consisting of Mg metal powder, MgH$_2$, Mg(AlH$_4$)$_2$, Mg(OH)$_2$, MgCO$_3$, MgCl$_2$, and MgO. Representative examples of the aluminum element-containing aluminum precursor may include one or a mixture of two or more selected from the group consisting of Al metal powder, AlH$_3$, Al(AlH$_4$)$_3$, Al(OH)$_3$, Al$_2$(CO$_3$)$_3$, AlCl$_3$, and Al$_2$O$_3$. Representative examples of the calcium element-containing calcium precursor may include one or a mixture of two or more selected from the group consisting of Ca metal powder, CaH$_2$, Ca(AlH$_4$)$_2$, Ca(OH)$_2$, CaCO$_3$, CaCl$_2$, and CaO.

The metal element is desirably included in an amount of 20 or less parts by weight, specifically 0.01 to 20 parts by weight, more specifically 0.1 to 20 parts by weight based on 100 parts by weight of the inorganic particle or inorganic oxide particle.

When the metal element content is below 0.01 parts by weight, doping concentration of the metal element may not be uniform inside the inorganic particle or inorganic oxide particle, and thus there is a limitation in that the doping effect is insignificant. In addition, when the metal element content exceeds 20 parts by weight, there is a limitation in that the exothermic reaction and fast reaction speed generated by the excessive amount of metal element doping may destroy the internal crystal structure and cause a rapid growth in the size of the internal Si crystal grains. Moreover, while active phases such as Li—Si compounds may be excessively formed, and since such active phases become unstable when externally exposed, thereby deteriorating the stability of the negative electrode active material.

In the method of the present disclosure, the step for baking the inorganic particle or inorganic oxide particle and the metal precursor is desirably performed at 500° C. to 2000° C., desirably 700° C. to 1200° C.

Heat treatment operations such as the step for baking are performed between the melting point and boiling point of lithium metal powder, which is the precursor, and the temperature condition is desirably adjusted in consideration of the type of the inorganic particle or inorganic oxide particle. For example, when the inorganic particle or inorganic oxide particle is SiO, since, above 1100° C., SiO is separated into SiO$_2$ and SiO such that Si grows as a crystalline material and causes excessive volumetric expansion, the advantage of controlling the volume of SiO is mitigated. Thus, when the inorganic particle or inorganic oxide particle is SiO, baking is desirably performed at or below 1100° C.

When the inorganic particle or inorganic oxide particle is SnO$_2$, increasing the baking temperature may cause the Sn particle in the SnO$_2$ to grow in size and thereby cause a sudden expansion in volume during charging/discharging. Thus, baking is desirably performed at or below 1100° C.

In the method of the present disclosure, the step for forming the polymer coating layer may include dissolving an organic polymer in an organic solvent to prepare a polymer coating solution; introducing the metal element-doped inorganic particle or inorganic oxide particle into the polymer coating solution and then stirring at room temperature; and removing the organic solvent and then drying.

Here, the organic polymer used for forming the polymer coating layer may be one or a mixture of two or more selected from the group consisting of polyethylene oxide, polyvinylpyrrolidone, polyacrylic acid, polyvinyl alcohol, polyethyleneimine, and polyacrylonitrile (PAN).

The organic solvent may include p-xylene, heptane, n-hexane, toluene, acetone, tetrahydrofuran, methylene fluoride, chloroform, dimethylformamide (DMF), n-methyl-2-pyrrolidone (NMP), cyclohexane, dichloromethane or a mixed solution thereof.

The polymer coating layer may be included in an amount of 0.1 to 10 parts by weight based on 100 parts by weight of the inorganic particle or inorganic oxide particle.

In the method of the present disclosure, after the reaction between the polymer coating solution and the metal element-doped inorganic particle or inorganic oxide particle has been completed, the organic solvent may be removed using a rotating heater, the metal element-doped inorganic particle or inorganic oxide particle on which a polymer coating film is formed may be dried at about 100° C. to 300° C. for about 8 hours, and the dried product may then be crushed using a mortar and pestle to thereby prepare the negative electrode active material for a lithium secondary battery of the present disclosure.

A negative electrode active material for a lithium secondary battery prepared by such a preparation method of the present disclosure may have a carbon coating layer and/or a polymer coating layer formed on the surface of a metal element-doped inorganic particle or inorganic oxide particle, and thus the surface of the negative electrode active material may be protected such that side reactions with an electrolyte solution are prevented and structural stability may be improved. Not only that, an effect may be obtained in which volumetric expansion of the negative electrode active material during the charging/discharging process is suppressed.

Negative Electrode

In an embodiment of the present disclosure, a negative electrode including a negative electrode active material prepared by using a method such as the above may be provided.

Here, a typical method that is well-known in the field may be used to manufacture the negative electrode. For example, the negative electrode may be manufactured by mixing and stirring the negative electrode active material prepared using the method of the present disclosure with a solvent and, as needed, a binder, a conductive material, and a dispersant to prepare a slurry, applying the slurry to a metallic current collector, and pressing and then drying the slurry composition.

In the present disclosure, any metallic current collector which is a high-conductivity metal to which the slurry for the negative electrode active material may easily adhere, and which is not reactive in the voltage range of the battery may be used. Non-limiting examples of the negative electrode current collector may be one or two or more selected from the group consisting of stainless steel, aluminum, nickel, titanium, baked carbon, copper; stainless steel which has been surface treated with carbon, nickel, titanium, or silver; aluminum-cadmium alloys; non-conductive polymers surface treated with conductive materials; and conductive polymers. Moreover, fine hills-and-valleys may be formed on the surface of the current collector and strengthen the binding strength of the negative electrode active material. The current collector may be used in a variety of forms such as a film, a sheet, a foil, a net, a porous body, a foamed body, or a non-woven fabric body.

The solvent for forming the negative electrode may be an organic solvent such as n-methylpyrrolidone (NMP), dimethylformamide (DMF), acetone, or dimethylacetamide; or water, and such solvents may be used alone or as a mixture of two or more thereof. The amount of the solvent used is sufficient when capable of dissolving and dispersing the negative electrode active material, the binder, and the conductive material, taking into consideration the thickness of the applied slurry and the manufacturing yield.

The binder is commonly added in an amount of 0.1 wt % to 20 wt % based on the total weight of the negative electrode material slurry composition, and representative examples of the binder may include at least one selected from the group consisting of polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer (EPDM), sulfonated-EPDM, styrene butadiene rubber (SBR), fluorocarbon rubber, and various copolymers thereof.

The conductive material may be added in an amount of 0.1 to 20 wt % based on the total weight of the negative electrode material slurry composition. The conductive material which does not cause a chemical change to the battery and is conductive may be used without particular limit, and representative examples include a graphite such as a natural graphite or a synthetic graphite; a carbon black such as acetylene black, Ketjen black, channel black, furnace black, lamp black, or thermal black; a conductive fiber such as a carbon fiber or a metal fiber; a conductive tube such as a carbon nanotube; a fluorocarbon; a metal powder such as aluminum or nickel powder; a conductive whisker such as zinc oxide or potassium titanate; a conductive metal oxide such as titanium oxide; and a conductive material such as a polyphenylene derivative.

An aqueous dispersant or an organic dispersant such as n-methyl-2-pyrrolidone may be used as the dispersant.

Secondary Battery

In an embodiment of the present disclosure is provided a lithium secondary battery including a positive electrode, a negative electrode, a separator interposed between the positive electrode and the negative electrode, and an electrolyte, wherein the negative electrode is the negative electrode of the present disclosure.

A typical lithium composite metal oxide particle capable of occluding and releasing lithium ions may be the positive electrode active material used in the positive electrode according to an embodiment of the present disclosure. The lithium composite metal oxide may include one or a mixture of two or more of a lithium-manganese-based oxide (for example, $LiMnO_2$, $LiMn_2O$, etc.), a lithium-cobalt-based oxide (for example, $LiCoO_2$, etc.), a lithium-nickel-based oxide (for example, $LiNiO_2$, etc.), a lithium-nickel-manganese-based oxide (for example, $LiNi_{1-x2}Mn_{x2}O_2$ (here, $0<x2<1$), $LiMn_{2-y}Ni_yO_4$ (here, $0<y<2$), etc.), a lithium-nickel-cobalt-based oxide (for example, $LiNi_{1-z}Co_zO_2$ (here, $0<z<1$), etc.), a lithium-nickel-cobalt-based oxide (for example, $LiCo_{1-a}Mn_aO_2$ (here, $0<z<1$), $LiMn_{2-b}Co_bO_4$ (here, $0<b<2$), etc.), a lithium-nickel-manganese-cobalt-based oxide (for example, $Li(Ni_PCo_QMn_R)O_2$ (here, $0<P<1$, $0<Q<1$, $0<R<1$, and $P+Q+R=1$), $Li(Ni_cCo_dMn_e)O_4$ (here, $0<c<2$, $0<d<2$, $0<e<2$, and $c+d+e=2$), etc.), or a lithium-nickel-cobalt-transition metal (M) oxide (for example, $Li(Ni_fCo_gMn_hM_i)O_2$ (here, M is selected from the group consisting of Al, Fe, V, Cr, Ti, Ta, Mg, and Mo, f, g, h, and i are each atomic fractions of independent elements and satisfy the conditions $0<f<1$, $0<g<1$, $0<h<1$, $0<i<1$, and $f+g+h+i=1$), etc.). Among these, in terms of being able to increase the capacity properties and stability of the battery, the lithium composite metal oxide may be $LiCoO_2$, $LiMnO_2$, $LiNiO_2$, a lithium nickel manganese cobalt oxide (for example, $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.) or a lithium nickel cobalt aluminum oxide (for example, $Li(Ni_{0.8}Co_{0.15}Al_{0.05})O_2$, etc.) and the like. Considering the significant effect of controlling the type and content ratio of the elements forming the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$ and the like, and one or a mixture of two or more thereof may be used.

The positive electrode current collector may typically be formed to a thickness of 3 to 500 μm. Such a positive electrode current collector which does not cause a chemical change in the battery and is conductive is not particularly limited. For example, aluminum, nickel, titanium, baked carbon, or aluminum-cadmium alloys, and the like may be used.

As with the negative electrode, typical binders and conductive materials may be used. The positive electrode may be manufactured by mixing and stirring the positive electrode active material with the additives to prepare a positive electrode active material slurry composition, and then applying and pressing the slurry composition onto the current collector.

The separator may be a typical porous polymer film conventionally used as a separator. For example, a porous polymer film prepared as a polyolefin-based polymer, such as an ethylene homopolymer, a propylene homopolymer, an ethylene/butene copolymer, an ethylene/hexene copolymer, or an ethylene/methacrylate copolymer, may be used alone or such films may be used by being laminated. Moreover, a typical porous non-woven fabric, for example, a non-woven fabric composed of a high-melting point glass fiber or polyethylene terephthalate fiber may be used. However, the separator is not limited thereto.

The electrolyte may be one composed of a lithium salt and an organic solvent, and a lithium salt typically used in electrolytes for lithium secondary batteries may be used without limit as the lithium salt. The lithium salt includes, for example, a lithium cation and an anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $N(CF_3SO_2)_2^-$, $N(SO_2F_2)_2^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $N(CF_3CF_2SO_2)_2^-$.

The electrolyte used in the present disclosure may be an organic liquid electrolyte, an organic liquid electrolyte, an inorganic liquid electrolyte, a solid polymer electrolyte, a gel-type polymer electrolyte, a solid inorganic electrolyte, or a melting-type inorganic electrolyte and the like, but is not limited thereto.

The external shape of the lithium secondary battery of the disclosure is not particular limited, and may be a cylindrical type that uses a can, a pouch type, or a coin type and the like.

The lithium secondary battery according to the present disclosure may not only be used in a battery cell used as a power source for small-scale devices, but may also be desirably used as a unit cell in mid- to large-scale battery modules that include a large number of battery cells.

Desirable examples of the mid- to large-scale devices may include electric vehicles, hybrid electric vehicles, plug-in hybrid electric vehicles, and electrical power storage systems, and the like, but are not limited thereto.

Hereinafter, in order to provide a specific description of the present disclosure, examples thereof are described in detail. However, the present disclosure may be modified in various ways, and the scope of the present disclosure should not be construed as being limited to the examples described below. The examples are provided to better describe the present disclosure to a person with ordinary skill in the art.

Hereinafter, although description is provided with reference to examples and experimental examples, the present disclosure is not limited by such examples and experimental examples.

EXAMPLES

Example 1

10 g of SiO having an average particle diameter of 4 μm was introduced into a rotating tube furnace, and the temperature was raised to 1000° C. at a rate of 5° C./min in an argon atmosphere. While rotating the rotating tube furnace, an SiO—C composite having a carbon coating layer formed on the surface of SiO was prepared by heat treating for 3 hours at 1000° C. while maintaining an acetylene gas flow of 0.3 L/min. Here, the carbon coating layer was included in amount of 5 parts by weight based on 100 parts by weight of the SiO particle.

Then, in an argon atmosphere, the SiO—C composite was mixed with a lithium metal powder (Li) in a 95:5 weight ratio and heat treated for 5 hours at 700° C. to prepare a first negative electrode active material including the elemental lithium-doped SiO—C composite. Here, the doped lithium element was included in amount of 5 parts by weight based on 100 parts by weight of the SiO particle.

Next, after dissolving 400 g of polyacrylonitrile at a concentration of 2% in n-methyl-2-pyrrolidone to prepare a polymer coating solution, 100 g of the first negative electrode active material was introduced into the polymer coating solution and stirred for 2 hours at ambient temperature (room temperature). After the reaction was completed, the reaction solution was placed into a 2 L round-bottom flask, and a rotating heater was used to remove the reaction solvent, that is, n-methyl-2-pyrrolidone, to prepare a second negative electrode active material having a polymer coating layer. Here, the polymer coating layer was included in amount of 2 parts by weight (about 50 nm in thickness) based on 100 parts by weight of the SiO particle.

After drying—for 8 hours at 130° C.—the reaction product from which the solvent was removed, the reaction product was crushed using a mortar and pestle to prepare the negative electrode active material of the present disclosure having a particle diameter of about 4 μm. An x-ray diffraction chart of the negative electrode active material of the present disclosure prepared as above is displayed in FIG. 2.

Figure 2:
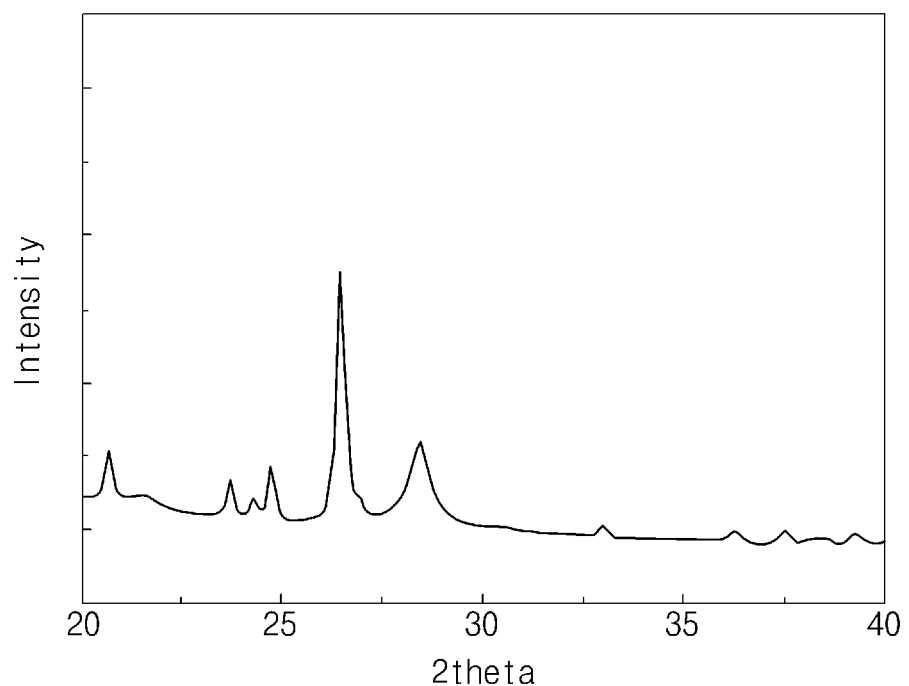
FIG. 2 illustrates an x-ray diffraction chart of a negative electrode active material prepared according to Example 1 of the present disclosure.

Referring to FIG. 2, it was observed that peaks appear on the x-axis of the XRD graph at 26.5°, indicating the formation of Si crystal grains in the interior; in the region from 23° to 25°, indicating the formation of $Li_2Si_2O_5$; and at 28°, indicating the formation of a lithium-silicate such as $Li_2SiO_3$. Thus, it may be seen that the interior of $SiO_x$ is doped with elemental Li.

Example 2

Other than not forming a carbon coating layer on the surface of the metal oxide, a negative electrode active material for a lithium secondary battery was prepared according to the same method as in Example 1.

Example 3

Other than using $SnO_2$ instead of SiO as the metal oxide, a negative electrode active material of the present disclosure was prepared according to the same method as in Example 1.

Example 4

Other than using $SiO_2$ instead of SiO as the metal oxide, a negative electrode active material of the present disclosure was prepared according to the same method as in Example 1.

Example 5

Other than using an aluminum (Al) metal powder instead of the lithium metal powder (Li) as the metal element, a negative electrode active material of the present disclosure was prepared according to the same method as in Example 1.

Example 6

Other than using $SnO_2$ instead of SiO as the metal oxide, a negative electrode active material of the present disclosure was prepared according to the same method as in Example 5.

Example 7

Other than using $SiO_2$ instead of SiO as the metal oxide, a negative electrode active material of the present disclosure was prepared according to the same method as in Example 5.

Example 8

Other than using a magnesium metal powder (Mg) instead of the lithium metal powder (Li) as the metal element, a negative electrode active material of the present disclosure was prepared according to the same method as in Example 1.

Example 9

Other than using a calcium metal powder (Ca) instead of the lithium metal powder (Li) as the metal element, a negative electrode active material of the present disclosure was prepared according to the same method as in Example 1.

Example 10

Other than using 20 parts by weight of the lithium metal powder (Li) as the metal element, a negative electrode active material of the present disclosure was prepared according to the same method as in Example 1.

Comparative Example 1

Other than not forming of the polymer coating layer, a negative electrode active material for a lithium secondary battery was prepared according to the same method as in Example 1.

Comparative Example 2

Other than doping 21 parts by weight of the lithium metal powder (Li) as the metal element, a negative electrode active material for a lithium secondary battery was prepared according to the same method as in Example 1.

Comparative Example 3

Other than doping 21 parts by weight of the lithium metal powder (Li) as the metal element, a negative electrode active material for a lithium secondary battery was prepared according to the same method as in Comparative Example 1.

Comparative Example 4

Other than doping 21 parts by weight of the aluminum metal powder (Al) as the metal element, a negative electrode active material of the present disclosure was prepared according to the same method as in Example 6.

Comparative Example 5

Other than doping 21 parts by weight of the aluminum metal powder (Al) as the metal element, a negative electrode active material of the present disclosure was prepared according to the same method as in Example 7.

EXPERIMENTAL EXAMPLES

Experimental Example 1

The respective negative electrode active materials prepared in Examples 1 to 10 and Comparative Examples 1 to 5 were mixed with carbon black and polyvinylidene fluoride in a 85:5:10 ratio in n-methyl-2-pyrrolidone to prepare negative electrode slurries. Each of the slurries was applied onto a copper current collector of 10 μm using a doctor-blade method, and the n-methyl-2-pyrrolidone was vaporized by drying for 1 hour at 100° C. in a vacuum atmosphere. Thereby, a negative electrode, in which a negative electrode active material layer having a thickness of 50 μm is laminated, was manufactured.

Next, a coin type cell was manufactured by setting the negative electrode as the working electrode and a metal lithium foil as the counter electrode, inserting a separator composed of a porous polypropylene film between the working electrode and the counter electrode, and then using as the electrolyte, a mixed solvent of diethyl carbonate (DEC) and ethylene carbonate (EC) (DEC:EC=1:1) with 1 mol/L of $LiPF_6$+FEC (fluoroethylene carbonate) dissolved therein as an additive, to a concentration of 5 wt %.

Figure 3A:
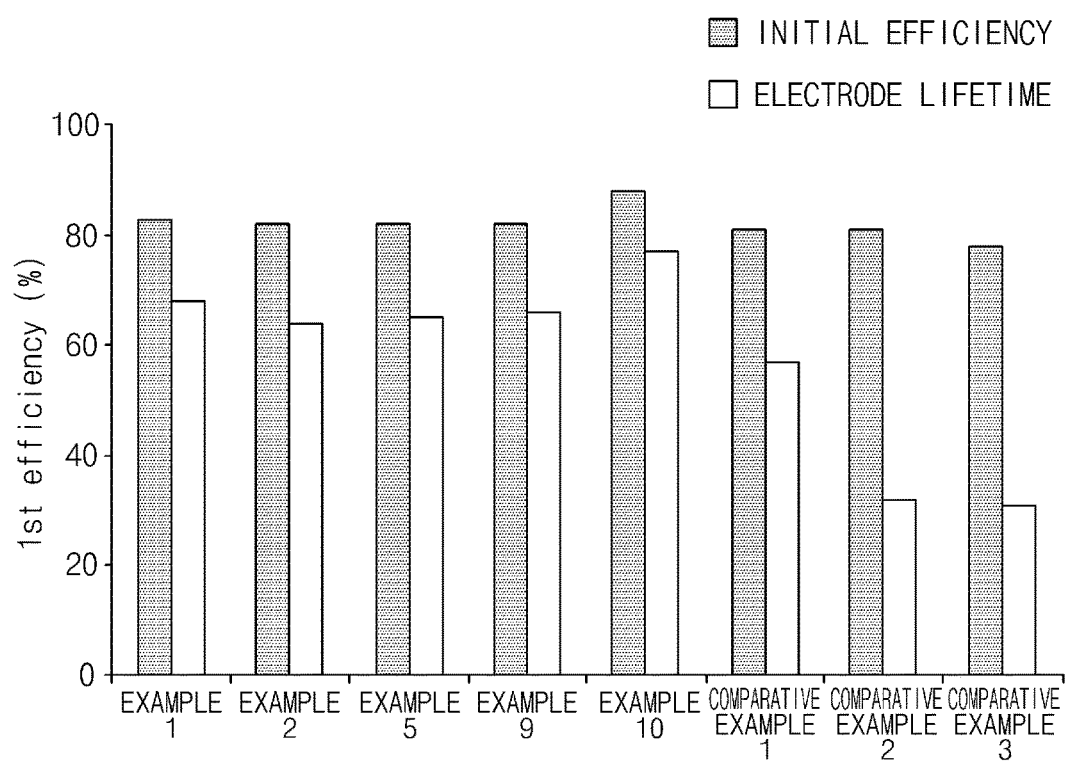
FIGS. 3A to 3C are graphs illustrating the initial efficiency and cycle lifetime properties of a lithium secondary battery according to Experimental Example 1 of the present disclosure.
Figure 3B:
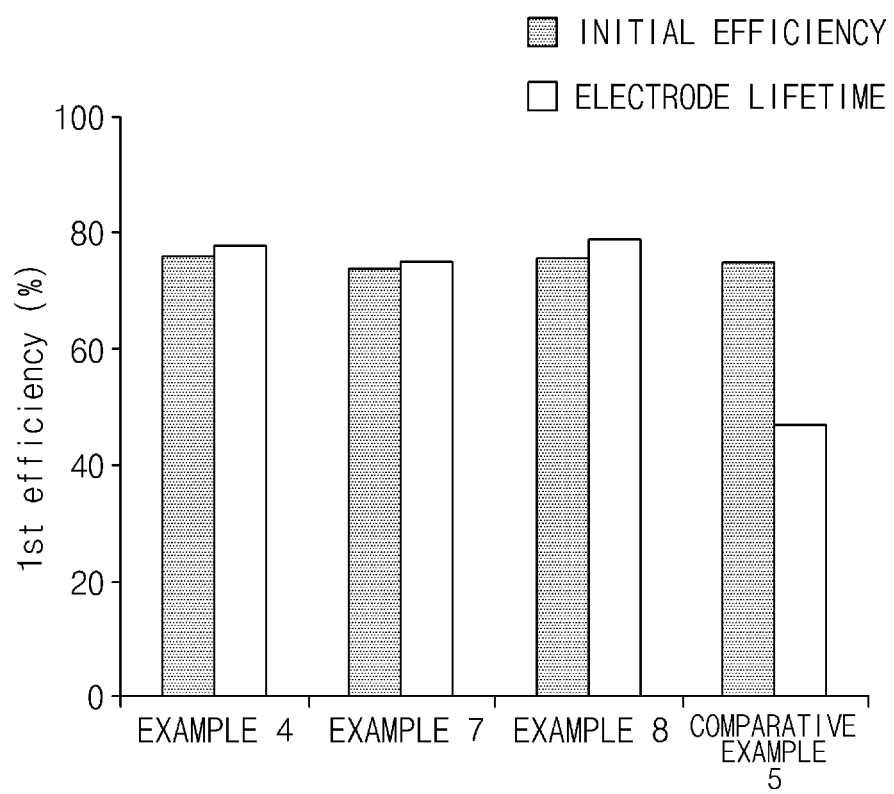
Figure 3C:
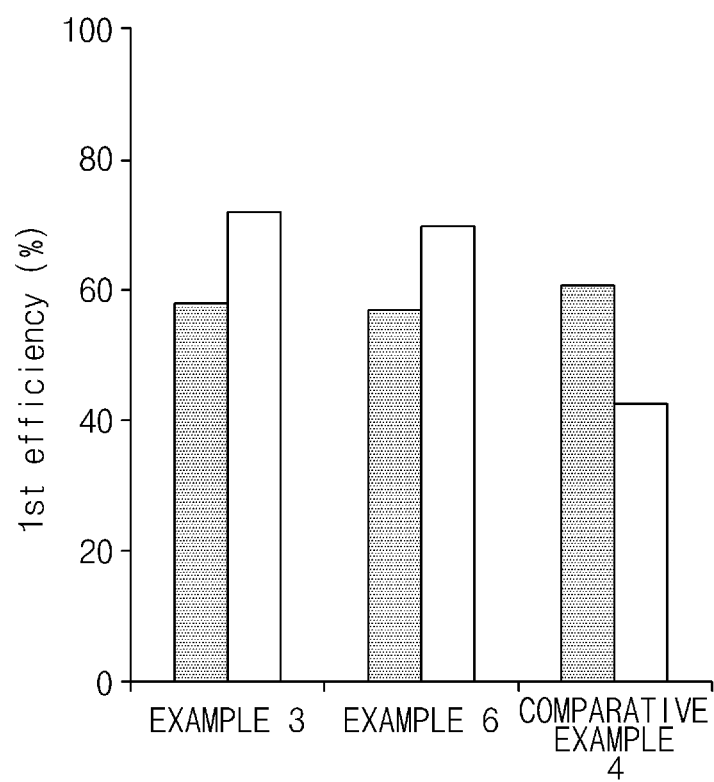

Afterwards, a charge/discharge test was performed by setting the charge/discharge current density to 0.2 C, the end-of-charge voltage to 0 V (Li/Li+), and the end-of-discharge voltage to 1.5 V (Li/Li+), and the initial charging efficiency and electrode lifetime results for each of the secondary batteries is displayed in Table 1 and FIGS. 3A to 3C.

TABLE 1

| | | Example 1 | Example 2 | Example 3 | Example 4 | Example 5 | Example 6 | Example 7 | Example 8 |
|---|---|---|---|---|---|---|---|---|---|
| Component ratio of Negative electrode active material | Core (100 parts by weight) | SiO | SiO | $SnO_2$ | $SiO_2$ | SiO | $SnO_2$ | $SiO_2$ | $SiO_2$ |
| | Li (parts by weight) | 5 parts by weight | 5 parts by weight | 5 parts by weight | 5 parts by weight | | | | |
| | Al (parts by weight) | | | | | 5 parts by weight | 5 parts by weight | 5 parts by weight | |
| | Mg (parts by weight) | | | | | | | | 5 parts by weight |
| | Ca (parts by weight) | | | | | | | | |
| | Carbon coating layer | 5 parts by weight | — | 5 parts by weight | 5 parts by weight | 5 parts by weight | 5 parts by weight | 5 parts by weight | 5 parts by weight |
| | Polymer coating layer | 2 parts by weight | 2 parts by weight | 2 parts by weight | 2 parts by weight | 2 parts by weight | 2 parts by weight | 2 parts by weight | 2 parts by weight |
| Discharge capacity (mAh/g) | | 1450 | 1420 | 745 | 980 | 1405 | 735 | 965 | 979 |
| Initial efficiency (%) | | 83 | 82 | 58 | 76 | 82 | 57 | 74 | 76 |
| Battery lifetime (%, after 100 cycles) | | 68 | 64 | 72 | 78 | 65 | 70 | 75 | 79 |

TABLE 1-continued

|  |  | Example 9 | Example 10 | Comparative Example 1 | Comparative Example 2 | Comparative Example 3 | Comparative Example 4 | Comparative Example 5 |
|---|---|---|---|---|---|---|---|---|
| Component ratio of Negative electrode active material | Core (100 parts by weight) | SiO | SiO | SiO | SiO | SiO | $SnO_2$ | $SiO_2$ |
|  | Li (parts by weight) |  | 20 parts by weight | 5 parts by weight | 21 parts by weight | 21 parts by weight |  |  |
|  | Al (parts by weight) |  |  |  |  |  | 21 parts by weight | 21 parts by weight |
|  | Mg (parts by weight) |  |  |  |  |  |  |  |
|  | Ca (parts by weight) | 5 parts by weight |  |  |  |  |  |  |
|  | Carbon coating layer | 5 parts by weight | 5 parts by weight | 5 parts by weight | 5 parts by weight | 5 parts by weight | 5 parts by weight | 5 parts by weight |
|  | Polymer coating layer | 2 parts by weight | 2 parts by weight | — | 2 parts by weight | — | 2 parts by weight | 2 parts by weight |
| Discharge capacity (mAh/g) |  | 1350 | 1350 | 1450 | 1300 | 1290 | 645 | 846 |
| Initial efficiency (%) |  | 82 | 88 | 81 | 81 | 78 | 61 | 75 |
| Battery lifetime (%, after 100 cycles) |  | 66 | 77 | 57 | 32 | 31 | 43 | 47 |

Examining Table 1 and FIGS. 3A to 3C, in the case of the secondary batteries in Examples 1 to 10 including the negative electrode active material of the present disclosure, it may be seen that not only the initial efficiency, but both the discharge capacity and lifetime properties were improved.

Specifically, in the case of the secondary batteries in Examples 1, 2, 5, 9, and 10, in which the negative electrode active material having the polymer coating layer and including SiO that is doped with 20 parts by weight or less of a metal element was used, it may be seen that in particular the cycle lifetime properties are excellent compared to the secondary battery in Comparative Example 1, in which the negative electrode active material (SiO) not including the polymer coating layer was used (see FIG. 3A). Moreover, in the case of the secondary batteries in Comparative Examples 2 and 3, in which the amount of metal element doping was excessive, a proper discharge capacity was not realized due to the destruction of the internal structure during the doping process and Si crystal grain growth, and thus it may be seen that the cycle lifetime properties are degraded compared to the secondary battery in Examples 1, 2, 5, 9, and 10.

A proper discharge capacity was also not achieved by the secondary battery in Comparative Example 5, in which was used the negative electrode active material including $SiO_2$ which was excessively doped with the metal element. Thus, it may be seed that the cycle lifetime properties are degraded compared to the secondary batteries in Examples 4, 7, and 8 (see FIG. 3B).

In the case of the secondary batteries in Examples 3 and 6, in which were used the negative electrode active materials including $SnO_2$ which was doped with about 5 parts by weight of the metal element, the cycle lifetime properties are significantly improved compared to the secondary battery in Comparative Example 4, in which the metal element doping was excessive (see FIG. 3C).

What is claimed is:

1. A negative electrode active material for a secondary battery, the negative electrode active material composed of a composite comprising:
    a metal element-doped inorganic oxide particle; and
    a polymer coating layer coated on the metal element-doped inorganic oxide particle,
    wherein the metal element is included in an amount of 0.01 to 20 parts by weight based on 100 parts by weight of the inorganic oxide particle,
    wherein the polymer coating layer is composed of an organic polymer which has a carbonization temperature of 800° C. or above and may be used in combination with an organic solvent, and
    wherein the organic polymer includes polyacrylonitrile (PAN).

2. The negative electrode active material of claim 1, wherein the inorganic oxide particle includes one selected from the group consisting of $SiO_x$ (0<x≤2) and $SnO_2$.

3. The negative electrode active material of claim 1, wherein the surface of the inorganic oxide particle includes a carbon coating layer.

4. The negative electrode active material of claim 3, wherein the carbon coating layer is formed by mixing and heat treating the inorganic oxide particle with a carbon precursor.

5. The negative electrode active material of claim 3, wherein the carbon coating layer is included in an amount of 0.005 to 30 parts by weight based on 100 parts by weight of the inorganic oxide particle.

6. The negative electrode active material of claim 1, wherein the metal element is at least one selected from the group consisting of Li, Na, K, Mg, Ca, and Al.

7. The negative electrode active material of claim 1, wherein the metal element is included in an amount of 0.1 to 20 parts by weight based on 100 parts by weight of the inorganic oxide particle.

8. The negative electrode active material of claim 1, wherein the thickness of the polymer coating layer is 20 to 200 nm.

9. The negative electrode active material of claim 1, wherein the polymer coating layer is included in an amount of 0.1 to 10 parts by weight based on 100 parts by weight of the inorganic oxide particle.

10. A method for preparing the negative electrode active material for a secondary battery of claim 1, the method comprising:
    mixing an inorganic oxide particle with a metal precursor in an inert atmosphere and then baking to prepare a metal element-doped inorganic oxide particle; and
    forming a polymer coating layer on the surface of the metal element-doped inorganic oxide particle,
    wherein the step for forming the polymer coating layer includes: dissolving an organic polymer in an organic solvent to prepare a polymer coating solution; introducing the metal element-doped inorganic oxide particle into the polymer coating solution and then stirring at room temperature; and removing the organic solvent and then drying, and
    wherein the organic polymer includes polyacrylonitrile (PAN).

11. The method of claim 10, further comprising step for forming a carbon coating layer on the surface of the inorganic oxide particle before mixing the inorganic oxide particle with the metal precursor.

12. The method of claim 11, wherein the step for forming the carbon coating layer includes:
    increasing the temperature of the inorganic oxide particle to 800° C. in an inert atmosphere;
    introducing the carbon precursor while stirring the inorganic oxide particle; and
    performing a heat treatment while mixing the inorganic oxide particle with the carbon precursor.

13. The method of claim 10, wherein the metal precursor includes at least one metal powder selected from the group consisting of Li, Na, Ca, K, Mg, and Al, or metal salts thereof.

14. The method of claim 10, wherein the metal element is mixed in an amount of 0.01 to 20 parts by weight based on 100 parts by weight of the inorganic oxide particle.

15. The method of claim 10, wherein the baking of the inorganic oxide particle with the metal precursor is performed at 500° C. to 2000° C.

16. The method of claim 10, wherein the polymer coating layer is included in an amount of 0.1 to 10 parts by weight based on 100 parts by weight of the inorganic oxide particle.

17. A negative electrode for a lithium secondary battery, the negative electrode comprising the negative electrode active material of claim 1.

18. A lithium secondary battery comprising:
    a positive electrode; a negative electrode; a separator interposed between the positive electrode and the negative electrode; and an electrolyte,
    wherein the negative electrode includes the negative electrode of claim 17.

19. The negative electrode active material of claim 1, wherein the polymer coating layer is coated on an entire outer surface of the metal element-doped inorganic oxide particle.

20. The method of claim 10, wherein the polymer coating layer is formed on an entire outer surface of the metal element-doped inorganic oxide particle.

* * * * *